(12) United States Patent
Mani et al.

(10) Patent No.: US 6,435,239 B1
(45) Date of Patent: Aug. 20, 2002

(54) PNEUMATIC TIRE HAVING MULTIPLE ELEMENT BEAD ASSEMBLY

(75) Inventors: Neel K. Mani, Stow; John L. Turner, Akron, both of OH (US); Thomas R. Branca, Bradford, MA (US); Hidetoshi Yokota, Kawasaki (JP); Brian E. Moore, Stow; Stanley J. Olesky, Akron, both of OH (US)

(73) Assignee: Bridgestone/Firestone North American Tire, LLC, Nashville, TN (US)

( * ) Notice: Subject to any disclaimer, the term of this patent is extended or adjusted under 35 U.S.C. 154(b) by 69 days.

(21) Appl. No.: 09/726,714

(22) Filed: Nov. 30, 2000

(51) Int. Cl.$^7$ .......................... B60C 15/00; B60C 15/06
(52) U.S. Cl. ...................... 152/541; 152/543; 152/547; 152/552
(58) Field of Search .................... 152/541, 546, 152/539, 543, 552, 547

(56) References Cited

U.S. PATENT DOCUMENTS

| | | | |
|---|---|---|---|
| 3,612,138 A | 10/1971 | Ravenhall | |
| 3,736,973 A | 6/1973 | Mezzanotte et al. | |
| 4,019,551 A | 4/1977 | Kolowski et al. | |
| 4,139,040 A | * 2/1979 | Samoto et al. | 152/541 |
| 4,609,023 A | * 9/1986 | Loser | 152/541 X |
| 4,627,479 A | 12/1986 | Shurman et al. | |
| 4,779,659 A | * 10/1988 | Hanada et al. | 152/541 |
| 4,790,364 A | * 12/1988 | Lobb et al. | 152/546 X |
| 4,872,497 A | * 10/1989 | Hanada et al. | 152/541 |
| 4,941,523 A | 7/1990 | Galante et al. | |
| 4,964,452 A | 10/1990 | Harrison et al. | |
| 5,033,524 A | 7/1991 | Ohtsuka | |
| 5,058,649 A | 10/1991 | Hoang et al. | |
| 5,318,089 A | 6/1994 | Tagashira et al. | |
| 5,368,082 A | 11/1994 | Oare et al. | |
| 5,427,166 A | 6/1995 | Willard, Jr. | |
| 5,868,190 A | 2/1999 | Willard, Jr. et al. | |
| 5,885,388 A | * 3/1999 | Ueyoko et al. | 152/546 X |

FOREIGN PATENT DOCUMENTS

WO    WO 98/52777    11/1998

\* cited by examiner

*Primary Examiner*—Adrienne C. Johnstone
(74) *Attorney, Agent, or Firm*—Meredith Palmer; Michael Sand

(57) ABSTRACT

The invention improves tire flat spotting by providing a bead assembly that has bead filler elements disposed outside the body cords so that the turn up portion of the ply of body cords is disposed immediately back against the main portion of the ply of body cords above the bead core. This carcass structure increases the stiffness of the lower sidewall and decreases the flat spotting experience by the tire. In one embodiment of the invention, a reinforcing ply is wrapped around the bead filler elements to further increases the stiffness of the lower sidewall. In another embodiment, a bead filler element is disposed inside the body cords so that an air pocket is not formed in the carcass during the manufacturing process.

7 Claims, 4 Drawing Sheets

PNEUMATIC TIRE HAVING MULTIPLE ELEMENT BEAD ASSEMBLY

BACKGROUND OF THE INVENTION

1. Field of the Invention

The present invention generally relates to pneumatic tires and, more particularly, to a pneumatic tire having a multiple element bead assembly that minimizes the cord force change under loading in the lower sidewall. Specifically, the present invention relates to a pneumatic tire having an axial inner bead filler element and an axial outer bead filler element that are both disposed outside the ply of body cords allowing the ply of body cords to be disposed against itself immediately above the bead core of the bead assembly. The position of the turn up portion decreases the lower sidewall cord tension variation which reduces flat spotting.

2. Background Information

One common carcass structure for a pneumatic tire includes a ply of main body cords that extend between a pair of bead assemblies. The body cords may extend radially or at a bias between the bead assemblies. Each bead assembly typically includes a loop-shaped bead core fabricated from a plurality of relatively stiff metal wires. Each bead assembly also typically includes a bead filler fabricated from a stiff rubber material. The bead filler is disposed radially above the bead core construction and fills the space between the main portion of the ply of body cords and the turn up portion of the ply of body cords. The shape and material of the bead filler has been altered in numerous prior art applications to provide different characteristics to the pneumatic tire.

The art recognizes that tire carcass design can influence the amount of flat spotting experienced by a tire when the tire is in use on a vehicle. Carcass designs that include turn ups disposed on the opposite side of the bead filler will experience different forces in the main body cords compared to the turn up portion. This is known as cord force variation. For instance, the turn up portion of the body cord may experience a decrease in tension while the main body cord portion experiences an increase in tension. The magnitude of the difference is proportional to the spacing between the main body cord portion and the turn up portion. The difference in these forces contributes to flat spotting. In some applications, the amount of flat spotting is to be reduced and the art desires a carcass structure that helps to reduce the amount of flat spotting.

SUMMARY OF THE INVENTION

In view of the foregoing, an aspect of the present invention is to reduce the amount of flat spotting in a pneumatic tire by improving the carcass design. In particular, the invention improves tire flat spotting by providing a bead assembly that has bead filler elements disposed outside the body cords so that the turn up portion of the ply of body cords may be disposed immediately back against the main portion of the ply of body cords above the bead core. This carcass structure reduces cord force variation around the tire under vertical load and decreases the flat spotting retained by the tire.

In another embodiment of the invention, a reinforcing ply is wrapped around the bead filler elements to further increases the stiffness of the lower sidewall. In a further embodiment, a bead filler element is disposed inside the body cords so that air pockets are not formed in the carcass during the manufacturing process.

BRIEF DESCRIPTION OF THE DRAWINGS

Similar numbers refer to similar elements throughout the specification.

DETAILED DESCRIPTION OF THE PREFERRED EMBODIMENT

Figure 1:
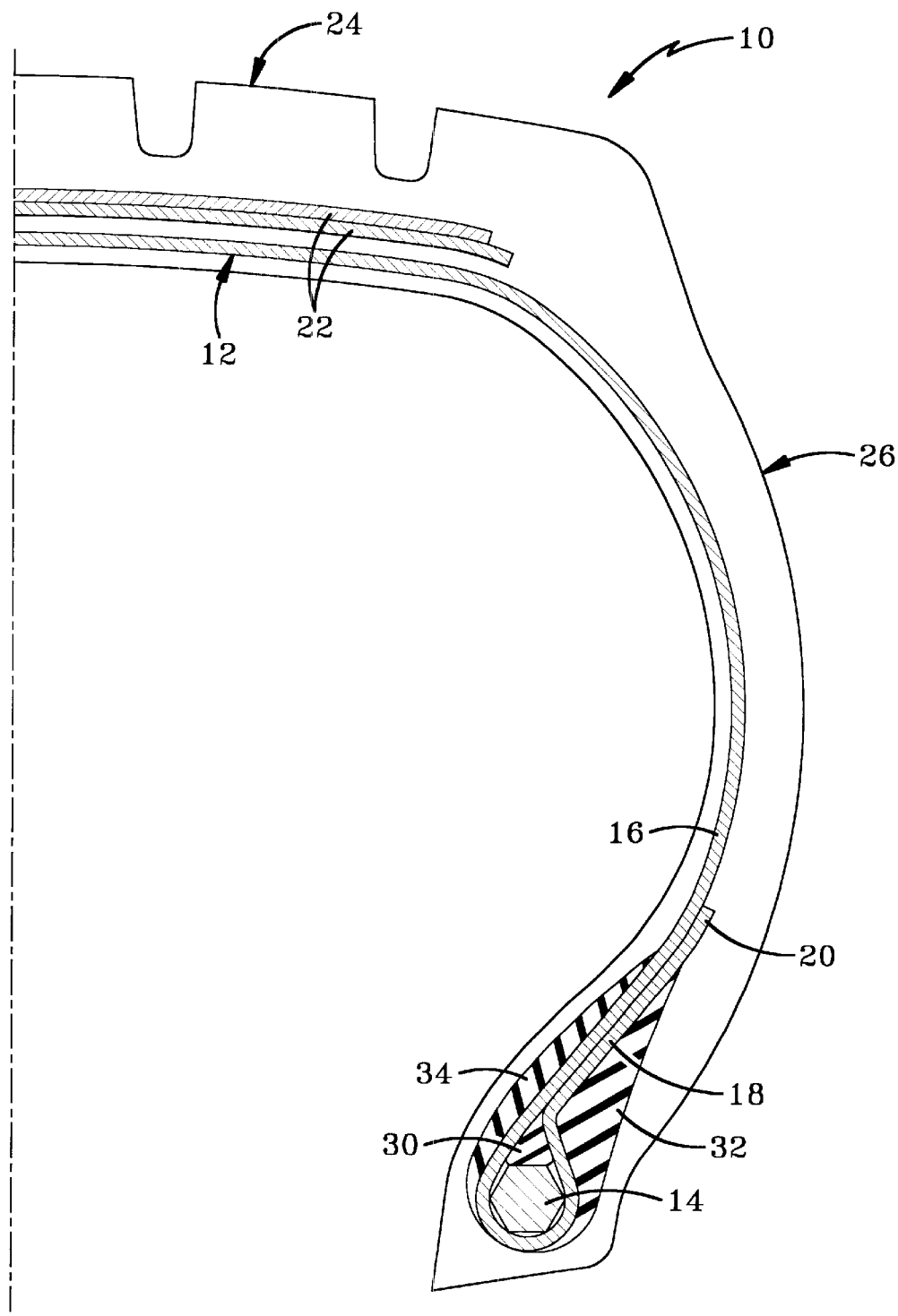
FIG. 1 is a cross sectional view of half of a pneumatic tire having the structure of a first embodiment of the present invention.
Figure 2:
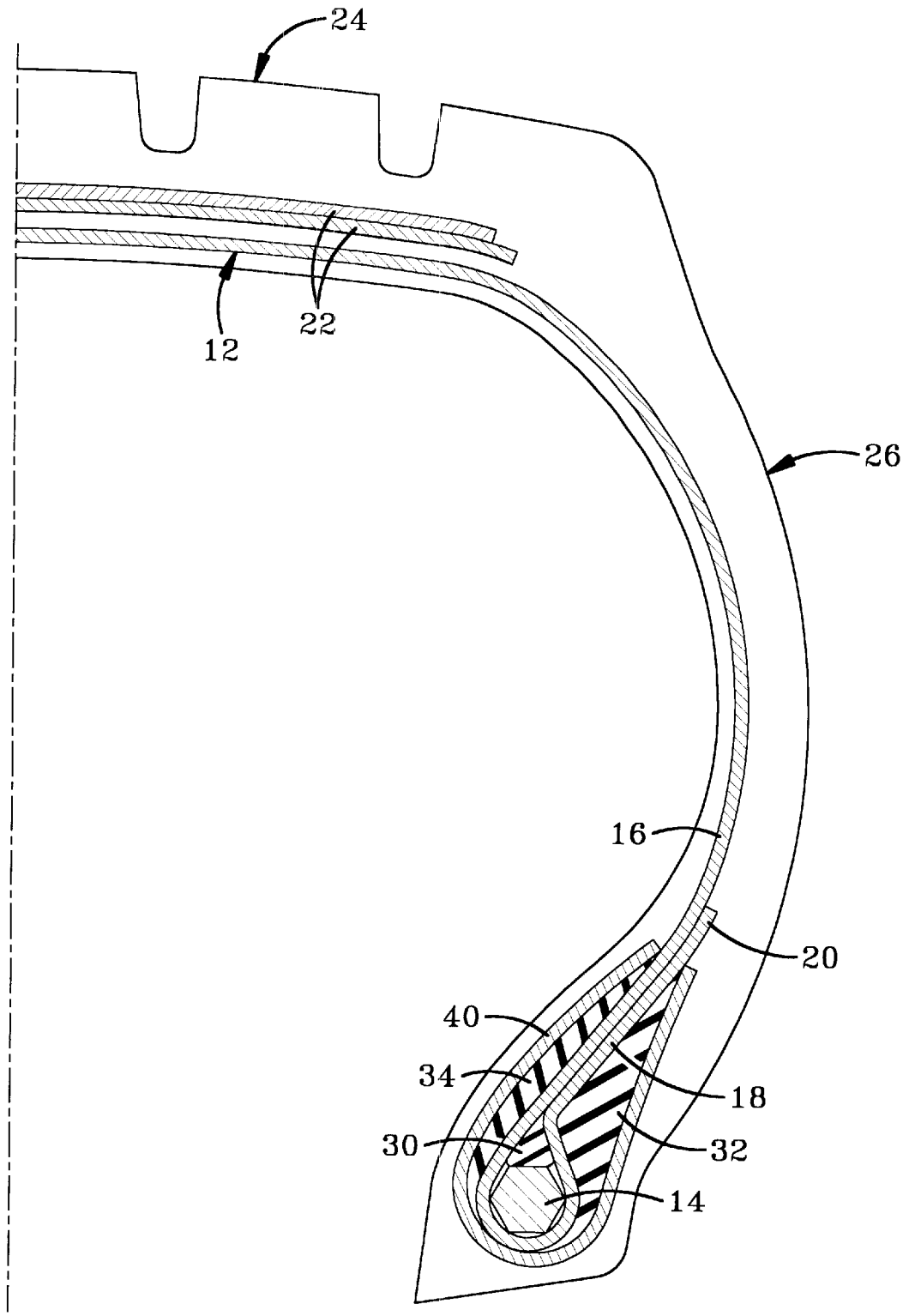
FIG. 2 is a view similar to FIG. 1 showing a second embodiment of the invention.
Figure 3:
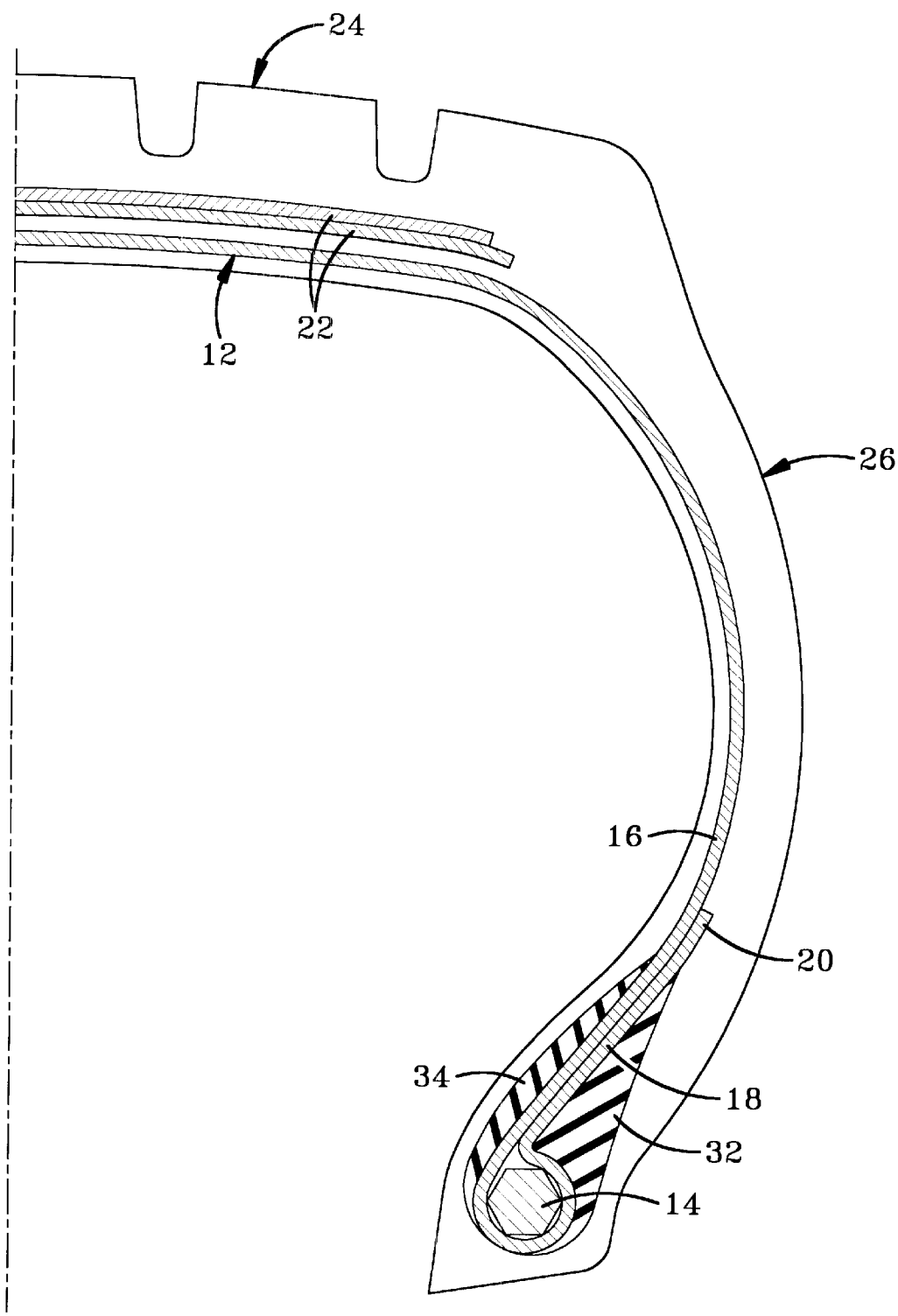
FIG. 3 is a view similar to FIG. 1 showing a third embodiment of the invention.
Figure 4:
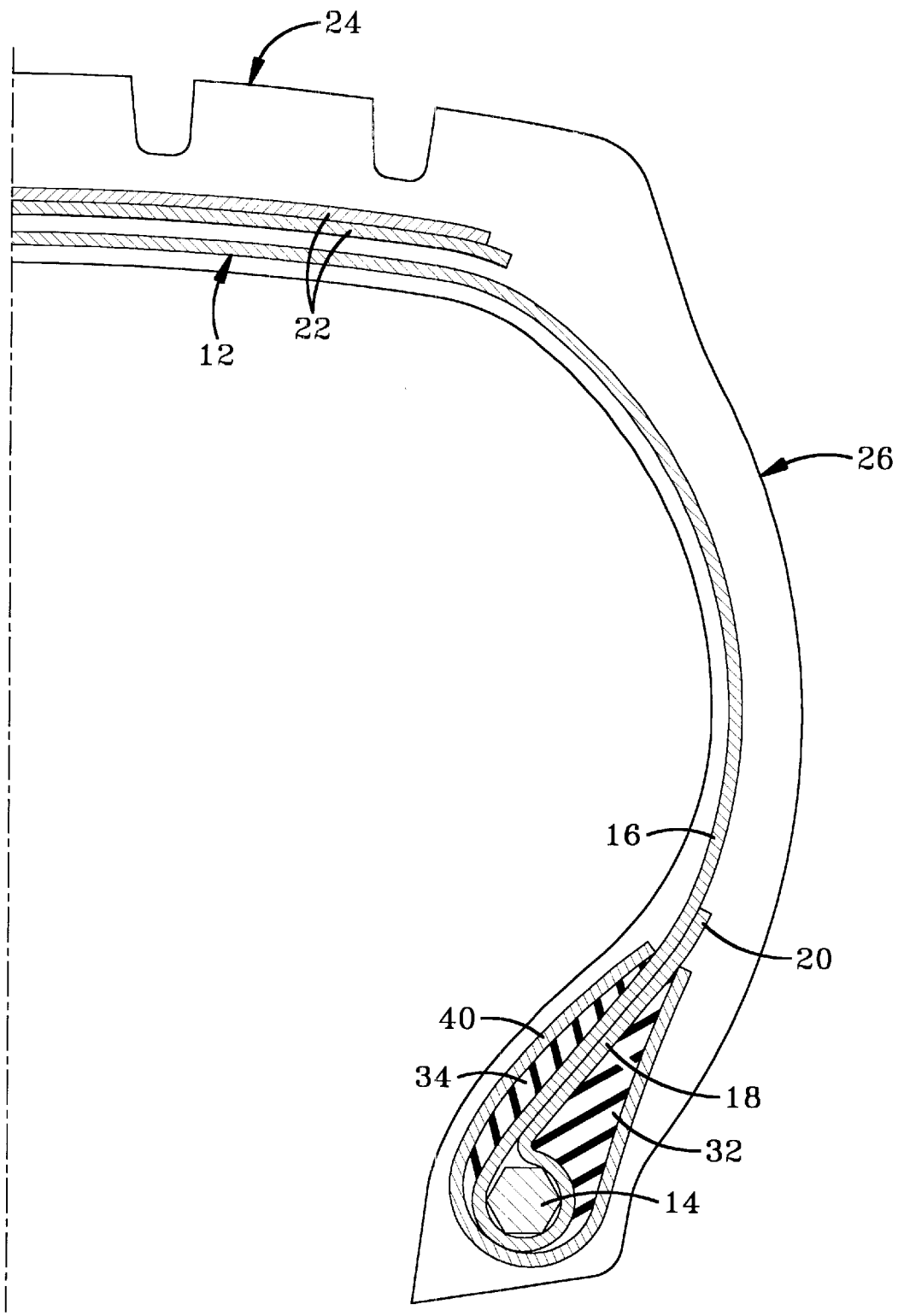
FIG. 4 is a view similar to FIG. 1 showing a fourth embodiment of the invention.

The first embodiment of the tire of the invention is indicated generally by the numeral 10 in FIG. 1. Tire 10 includes a ply of body cords 12 that extend and wrap around a pair of bead cores 14. Only half of tire 10 is depicted in the drawings with the other half being a substantial mirror image of the half depicted. The ply of body cords 12 includes a main body portion 16 and a turn up portion 18. Turn up portion 18 includes a radial outer end 20. Tire 10 also includes belt plies 22 disposed below the tread portion 24. Bead cores 14, belt plies 22, and body cord ply 12 are disposed in the body 26 of tire 10.

Turn up portion 18 is disposed back against body portion 16 of ply 12 immediately above bead core 14. Turn up portion 18 then extends radially upwardly against ply 12. In the embodiment of the invention depicted in FIG. 1, end 20 is disposed radially below the maximum section width of tire 10. In other embodiments, end 20 may be disposed radially above the maximum section width. The positioning of turn up portion 18 against main body portion 16 decreases bending strains in the body ply cords of tire 10 and helps tire 10 to resist body cord creep variations around the tire. By positioning turn up portion 18 immediately back against body portion 16, there is little cord force variation between the two portions because the portions experience similar forces. The amount of flat spotting attributed to the cord force variation is thus minimized.

Tire 10 further includes a plurality of bead filler elements that cooperate with bead core 14 to form the bead assembly of tire 10. An intermediate bead filler element 30 is disposed radially above bead core 14 intermediate bead core 14, main body portion 16, and turn up portion 18. Intermediate bead filler element 30 has a low height so that turn up portion 18 is disposed back against main body portion 16 immediately above bead core 14. In the preferred embodiment of the invention, the height of intermediate bead filler element is between zero and 1.3 centimeters. In one embodiment, the height is 1.27 cm. Intermediate bead filler element 30 is provided to prevent air pockets from being trapped in the sidewall of tire 10 when tire 10 is manufactured.

Tire 10 also includes an axial outer bead filler element 32 and an axial inner bead filler element 34 disposed on either side of bead core 14 and outside the body cords. Axial outer bead filler element 32 is positioned so that at least a portion of turn up portion 18 is disposed intermediate element 32 and bead core 14. Axial inner bead filler element 34 is positioned so that at least a portion of main body portion 16 is disposed intermediate element 34 and bead core 14. Each element 32 and 34 includes an upper end and a lower end. The lower ends are disposed adjacent each other under bead core 14. The upper ends of elements 32 and 34 are tapered. In the embodiment of the invention depicted in the drawings, the upper ends of elements 32 and 34 are disposed below end 20.

The cross sectional shape of elements 32 and 34 may be varied to fit the particular tire application. In the preferred embodiment, axial outer bead filler element 32 has a maximum width disposed at the upper end of intermediate bead filler element 30. The width tapers from the maximum width in the upper and lower directions. Axial inner bead filler element 34 has a maximum width adjacent bead core 14 and tapers under bead core 14 and in the upper direction.

Each element 30, 32, and 34 is preferably fabricated from a rubber material having a modulus of about 80 MPa or higher. Bead filler elements 30, 32, and 34 are stiff in order to cooperate with turn up portion 18 to stiffen the lower portion of the sidewall.

By moving the bead filler from its traditional location to the locations described above, turn up portion 18 may be moved immediately back against main body portion 16 to increase the stiffness of the lower sidewall of tire 10. The increased stiffness decreases the flat spotting of tire 10.

In the second embodiment of the invention, a low creep reinforcing ply 40 is wrapped around the outside of elements 32 and 34 to further stiffen the sidewall. Ply 40 includes upper ends that are disposed at substantially the same locations as the upper ends of elements 32 and 34. In other embodiments of the invention, the upper ends of ply 40 are disposed higher than the upper ends of elements 32 and 34. Ply 40 may be reinforced with steel, polyester, rayon, aramid, nylon, or other materials known to those skilled in the art.

In the third and fourth embodiments of the invention, intermediate bead filler element 30 is removed and turn up portion 18 wraps directly around bead core 14 until it contacts main body portion 16 of ply 12. In these embodiments, the entire bead filler is disposed outside the body cords. In the fourth embodiment, reinforcing ply 40 wraps around elements 32 and 34.

The invention is not limited to the specific illustrative details that appear above. Other variations and modifications are equivalent for the stated and illustrated functions without departing from the spirit or scope of the invention as defined by the following claims.

What is claimed is:

1. A pneumatic tire, comprising:

a body having a maximum section width;

a pair of bead assemblies disposed in the lower section of the body;

each of the bead assemblies including a bead core and a bead filler assembly;

each bead filler assembly including an axial inner bead filler element, an axial outer bead filler element, and an intermediate bead filler element;

a ply of body cords disposed in the body;

the ply of body cords extending between the bead assemblies;

the ply of body cords including a body portion and a turn up portion having a turn up end;

the ply of body cords being wrapped around each bead core;

the turn up portion being disposed adjacent the body portion of the ply of body cords radially above the bead cores;

the body portion of the ply of body cords being disposed intermediate the axial inner bead filler element and the bead core;

the turn up portion of the ply of body cords being disposed intermediate the axial outer bead filler element and the bead core;

the intermediate bead filler element being disposed intermediate the body portion, the turn up portion, and the bead core; and the axial inner and outer bead filler elements having upper and lower ends with the lower ends being disposed adjacent each other.

2. The tire of claim 1, further comprising a reinforcing ply wrapped around the bead filler elements.

3. The tire of claim 1, wherein the lower ends of the elements are disposed under the bead core.

4. The tire of claim 1, wherein the axial outer bead element has a maximum thickness disposed at the upper end of the intermediate bead filler element.

5. The tire of claim 4, wherein the axial inner bead element has a maximum thickness disposed adjacent the bead core.

6. The tire of claim 1, wherein each of the bead filler elements are fabricated from a stiff rubber material.

7. The tire of claim 6, wherein the stiff rubber material has a modulus of at least 80 MPa.

* * * * *